Nov. 25, 1958
E. P. POLIVKA
2,861,536
LOCKING DEVICE FOR HANDWHEEL ASSEMBLY
Filed March 27, 1957
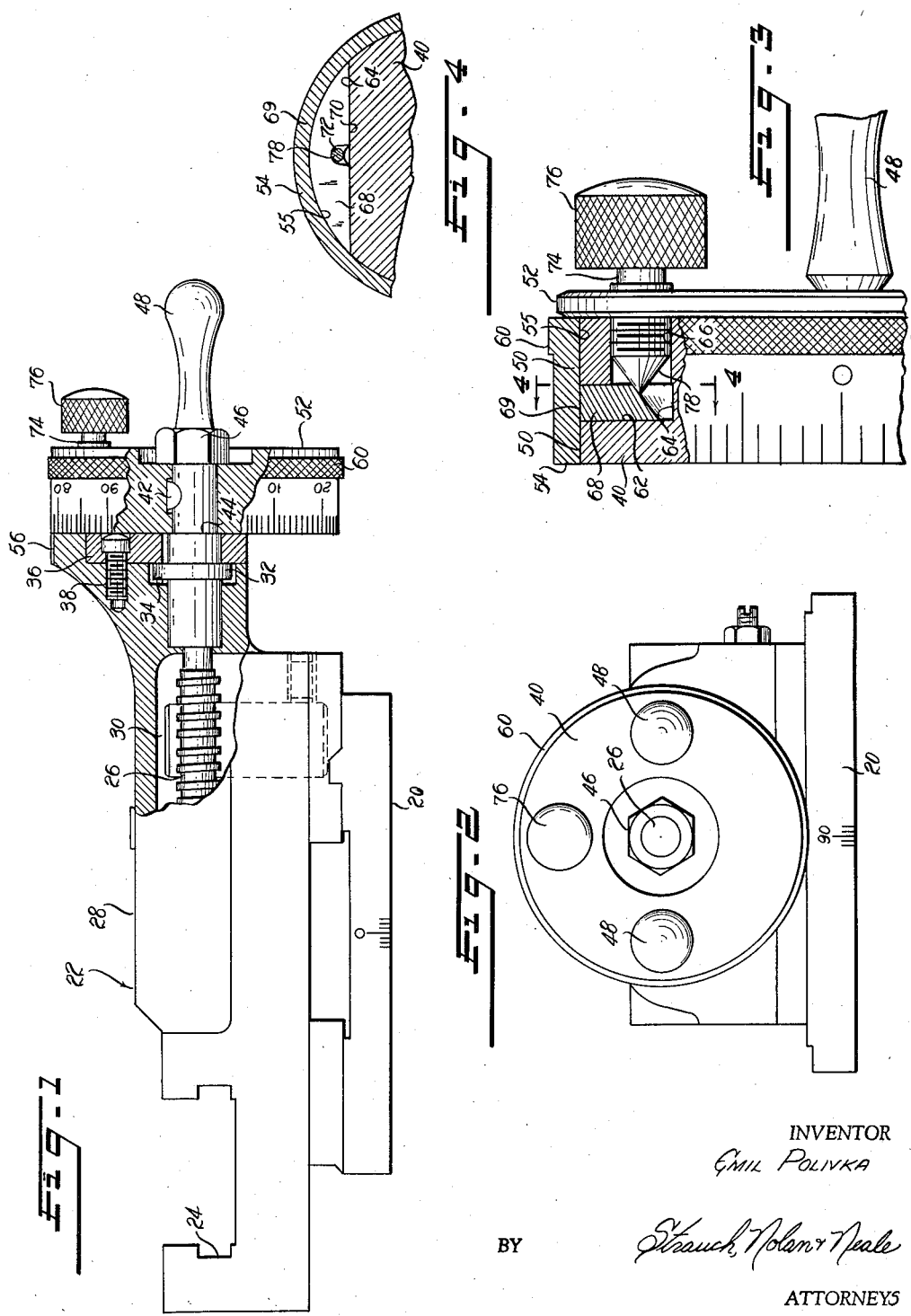
INVENTOR
EMIL POLIVKA
BY
ATTORNEYS

United States Patent Office 2,861,536
Patented Nov. 25, 1958

2,861,536

LOCKING DEVICE FOR HANDWHEEL ASSEMBLY

Emil P. Polivka, Pittsburgh, Pa., assignor to Rockwell Manufacturing Company, Pittsburgh, Pa., a corporation of Pennsylvania Application March 27, 1957, Serial No. 648,881

4 Claims. (Cl. 116—124)

This invention relates to indicator assemblies and more particularly to such assemblies in use in determining the movement of a tool, for example, a cutting tool in a metal cutting lathe or a similar precision machine tool.

In metal cutting lathes both the cross slide and the compound slide are moved by axially fixed rotatable feed screws which are operated by hand wheels. Annular dials are mounted on the outer periphery of the hand wheels and carry graduations which cooperate with a reference mark on an adjacent relatively fixed portion of the cross slide or compound slide to provide an accurate indication of the feeding movement of the cross slide or the compound slide.

Normally it is necessary to measure the amount of tool feed from an arbitrarily selected reference point, for example, a previously finished portion of the work piece. In a typical case, the operator may wish to make a groove of pre-determined depth in the work piece. To accomplish this operation the operator first moves the tool into contact with the work piece. If the dial and the hand wheel are non-rotatably connected, the operator must note the reading on the dial if one of the scale marks on the dial coincides with the reference mark on the compound or must estimate the reading if the graduation on the dial does not coincide with the reference mark. The operator can then move the tool inwardly during the cutting operation until the dial reading is increased by an amount equal to the depth of the desired groove.

To facilitate this operation it has been proposed to mount the dial for rotation on the hand wheel so that the dial may be adjusted to read zero at the start of the cut. In such prior constructions, spring clips or other similar means have been provided to establish a frictional drag between the hand wheel and the dial to prevent unintentional relative movement of the dial with respect to the hand wheel during the cutting operation. In using an indicator assembly of this type, the operator initially rotates the hand wheel to bring the tool into contact with the work piece then holds the hand wheel stationary while rotating the dial to bring the zero point opposite the reference mark on the compound. However, since the frictional drag between the hand wheel and the indicator dial must be made relatively strong to prevent displacement of the dial and the hand wheel during the cutting operation when the assembly is exposed to the vibration of the machine the original adjustment of the tool is often lost when the dial is rotated over the hand wheel during the initial setting operation.

With the foregoing considerations in mind, it is the principal purpose and object of the present invention to provide improved indicator hand wheel assemblies of the type described which eliminate the above-stated disadvantages of prior mechanisms and which may be easily and accurately brought to zero adjustment and thereafter positively locked in adjusted position.

In attaining this primary object and others, the present invention provides an improved hand wheel assembly having an indicator dial which is mounted for free rotation on the hand wheel and which may be positively locked against rotation with respect to the hand wheel by a wedging apparatus of novel construction.

It is an additional object of the present invention to provide improved means for mounting an indicator on a hand wheel assembly and a novel mechanism for selectively releasing the indicator for free rotation about the axis of the hand wheel assembly or for positively locking the indicator against rotation with respect to the hand wheel assembly.

It is a more specific object to provide a novel wedge construction for selectively locking and releasing an indicator dial mounted on a hand wheel assembly.

Additional objects and advantages will become apparent as the description proceeds in connection with the accompanying drawings in which:

Figure 1 is a side elevation partly in section of a compound slide assembly incorporating the preferred embodiment of the present invention;

Figure 2 is an end elevation of the assembly of Figure 1;

Figure 3 is an enlarged fragmentary sectional view of a portion of the apparatus of Figure 1; and Figure 4 is a fragmentary section taken along line 4—4 of Figure 3 showing details of construction.

Figure 1 illustrates the hand wheel assembly of the present invention applied to a compound slide assembly of essentially conventional construction. The portion of the assembly illustrated includes a swivel saddle 20 adapted to be mounted on a conventional lathe cross slide (not shown). An upper slide assembly indicated generally at 22, which is provided with ways 24 for supporting a tool holder, is mounted for sliding movement on the swivel saddle 20 by suitable ways, not shown. A feed screw 26 rotatably mounted in a housing 28 is threaded through a feed nut 30 mounted on the swivel saddle 20. The feed screw 26 is locked against axial movement with respect to the housing 28 by a shoulder 32 which is held in recess 34 by a plate 36 secured to the housing 28 by one or more screws 38.

A hand wheel body member 40 is non-rotatably mounted on the projecting end portion of the feed screw by a key 42 and is held against a shoulder 44 on the feed screw by a nut 46. In accordance with conventional practice, a pair of handles 48 are mounted on the outer surface of the handwheel body member 40. As best shown in Figure 3, the handwheel body 40 is provided with an outer cylindrical surface portion 50 which terminates at its outer end in a relatively enlarged portion 52.

An indicator collar 54, having an inner cylindrical surface 55 is journalled on the outer cylindrical surface portion 50 of the handwheel body and is received between the enlarged end portion 52 of the handwheel body and the outer surface of housing 28. On its outer surface the indicator collar 54 is provided with a series of graduations which cooperate with a groove or scribe line 56 formed on the housing member 28 to indicate the rotated position of the dial and thereby the axial position of the feed screw. The dial is also provided with a raised knurled portion 60 to facilitate manual adjustment.

The novel locking assembly of the present invention will now be described with particular reference to Figures 3 and 4. As there shown, a slot 62 having a flat bottom surface 64 is milled in the cylindrical portion of the hand wheel body 40, the surface 64 forming a chord of the surface 50. A drilled and tapped opening 66 extends from the outer face of the hand wheel body 40 into the slot 62. Received in the slot 62 is a wedge member 68 having an outer arcuate surface 69 formed on the same or slightly greater radius than the radius of the surface 50 and having a flat bottom surface 70 adapted to rest on the bottom surface 64 of the slot 62. The slot 62 and the wedge 68 are so dimensioned that in assembly the outer surface of the wedge 68 is in clearance relation with the inner cylindrical surface of the dial collar when the wedge is bottomed in the slot 62.

Formed at the mid-point of the bottom surface 70 of the wedge member 68 is a recess 72 having an arcuate bottom surface disposed in an angle of approximately 30° with respect to the axis of the handwheel body 40. A locking screw 74 provided with a knurled head 76 is threaded into the tapped opening 66 and is provided with a cone point 78 having a 60° taper extending into the recess 72 in the wedge 68.

Accordingly, the dial collar rotates freely with respect to the handwheel body 40 when the locking screw 74 is withdrawn and will be securely locked against such rotation by the wedge 68 when the screw 74 is tightened. It will be noted that the cooperating cone point 78 of the locking screw and the tapered central recess 72 on the wedge are also effective to prevent lateral movement of the wedge thereby entirely eliminating the possibility of jamming the dial collar when the locking screw 74 is loosened.

In operation, assuming that it is desired to make a groove .032 inch deep in a work piece, the operator will move the tool into contact with the surface of the work piece, preferably with the locking screw 74 loosened. The operator then rotates the dial collar until the zero point is opposite the reference mark 58 on the housing 28. During the zeroing operation there is no tendency for the handwheel body 40 to rotate away from its adjusted position. When the dial has been zeroed, the screw 74 is tightened to firmly lock the dial against rotation with respect to the handwheel 40. The groove is formed to the desired depth by advancing the tool until the .032 inch mark on the dial is aligned with the reference mark on the compound housing. Maximum accuracy is assured during this operation since the novel assembly of the present invention assures accuracy of the initial setting and the maintenance of the setting during the cutting operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A handwheel assembly for rotating a feed screw to position a tool in a lathe device comprising, a handwheel body member connected to said feed screw and carrying an operating handle, said body member havng an outer cylindrical surface, an indicator collar having an inner cylindrical surface journalled on said cylindrical surface of said body member, said collar having graduations on its outer surface cooperating with a reference mark on an adjacent portion of said lathe to indicate the rotated position of said dial, a wedge member mounted for radial movement in a recess in said body member, said wedge member having an outer arcuate surface portion formed on substantially the same radius as the inner surface of said collar, and a screw threaded into said body member for selectively urging said wedge member radially into locking engagement with said collar.

2. The combination according to claim 1 wherein said wedge member is provided with a tapered recess and wherein said screw threaded into said body has a cone point engageable with said tapered recess.

3. Apparatus for selectively locking and releasing an indicator dial journalled on an outer cylindrical portion of a handwheel body comprising, a wedge mounted in a slot in said body member for bodily shifting movement radially of said handwheel body, said wedge having an outer arcuate surface formed on substantially the said radius as the inner surface of said indicator dial and having a tapered recess, and a screw threaded in said handwheel body and having a cone point selectively engageable with said tapered recess whereby when said screw is tightened said wedge will be urged radially outward to force said outer surface of said wedge into tight frictional engagement with said indicator dial.

4. A handwheel assembly for rotating a feed screw to position a tool in a lathe device comprising, a handwheel body member connected to said feed screw and carrying an operating handle, said body member havng an outer cylindrical surface, an indicator collar having an inner cylindrical surface journalled on said outer cylindrical surface of said body member, said collar having graduations on its outer surface cooperating with a reference mark on an adjacent portion of said lathe to indicate the rotated position of said dial, a wedge member mounted in a slot in said body member for bodily shifting movement radially of said body member, said wedge member having an outer cylindrical surface formed on substantially the same radius as said inner cylindrical surface of said indicator collar, the side surfaces of said slot and said wedge member being parallel and being substantially normal to the axis of said body member, said wedge member being provided with a tapered recess, and a screw threaded into said body member and having a cone point engageable with said tapered recess whereby when said screw is tightened said wedge member will be urged radially outward to force said cylindrical surface into tight frictional surface engagement with the inner cylindrical surface of said indicator collar.

References Cited in the file of this patent

UNITED STATES PATENTS 2,055,488     Green _____ Sept. 29, 1936